United States Patent
Moeckly et al.

(10) Patent No.: US 8,417,410 B2
(45) Date of Patent: Apr. 9, 2013

(54) OPERATIONS SUPPORT SYSTEMS AND METHODS WITH POWER MANAGEMENT

(75) Inventors: Kevin Moeckly, Chandler, AZ (US); Jan Goericke, Phoenix, AZ (US); Andy Stramiello, Mesa, AZ (US); Richard Ling, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 1016 days.

(21) Appl. No.: 12/342,581

(22) Filed: Dec. 23, 2008

(65) Prior Publication Data

US 2010/0161154 A1    Jun. 24, 2010

(51) Int. Cl.
*G01M 13/00* (2006.01)

(52) U.S. Cl. ............ 701/29.1; 701/3; 701/29.3; 701/99; 702/184; 340/945

(58) Field of Classification Search ................. 701/3, 14, 701/29–30, 34.4, 99; 702/182–184; 340/945, 340/963
See application file for complete search history.

(56) References Cited

U.S. PATENT DOCUMENTS

| | | | |
|---|---|---|---|
| 4,467,640 A * | 8/1984 | Morrison | 73/112.03 |
| 5,050,081 A * | 9/1991 | Abbott et al. | 701/14 |
| 6,195,598 B1 | 2/2001 | Bosqui et al. | |
| 6,532,412 B2 | 3/2003 | Adibhatla et al. | |
| 6,553,958 B1 | 4/2003 | Kolmanovsky et al. | |
| 6,643,570 B2 | 11/2003 | Bangert et al. | |
| 6,795,799 B2 | 9/2004 | Deb et al. | |
| 6,832,205 B1 | 12/2004 | Aragones et al. | |
| 6,871,160 B2 | 3/2005 | Jaw | |
| 6,959,236 B2 | 10/2005 | Betters et al. | |
| 7,031,812 B1 * | 4/2006 | Pettigrew et al. | 701/14 |
| 7,058,556 B2 | 6/2006 | Desai et al. | |
| 7,062,370 B2 | 6/2006 | Vhora et al. | |
| 7,111,611 B1 | 9/2006 | Lyon | |
| 7,158,919 B2 | 1/2007 | Wright et al. | |
| 7,212,942 B2 | 5/2007 | Vollum | |
| 7,260,501 B2 | 8/2007 | Pattipatti et al. | |

(Continued)

FOREIGN PATENT DOCUMENTS

| | | |
|---|---|---|
| EP | 1970786 A2 | 9/2008 |
| WO | 8103079 A1 | 10/1981 |

OTHER PUBLICATIONS

Search report issued on Apr. 1, 2010 for European Patent Application No. 09178440.

*Primary Examiner* — Thomas Black
*Assistant Examiner* — Ce Li
(74) *Attorney, Agent, or Firm* — Ingrassia Fisher & Lorenz, P.C.

(57) ABSTRACT

A power management system includes a data fusion unit configured to receive first health indicators from an engine diagnostics module and second health indicators from a power assurance module. The data fusion unit is configured to data fuse the first and second health indicators. A power assessment and decision support unit is coupled to the data fusion unit and configured to generate power available based on the fused first and second health indicators. A system diagnostic reasoner unit is coupled to the data fusion unit, and configured to provide a system level fault diagnosis based on the fused first and second health indicators. A graphical user interface is coupled to the power assessment and decision support unit and the system diagnostic reasoned unit. The graphical user interface is configured to display the system level fault diagnosis and the power available.

19 Claims, 11 Drawing Sheets

U.S. PATENT DOCUMENTS

| | | | |
|---|---|---|---|
| 7,322,178 B2 | 1/2008 | Simoni | |
| 7,328,128 B2 | 2/2008 | Bonanni et al. | |
| 7,349,825 B1 * | 3/2008 | Williams et al. | 702/182 |
| 7,379,799 B2 | 5/2008 | Cleary et al. | |
| 7,392,129 B2 | 6/2008 | Hill et al. | |
| 7,472,100 B2 | 12/2008 | Volponi et al. | |
| 2002/0184178 A1 | 12/2002 | Tasooji et al. | |
| 2003/0074171 A1 * | 4/2003 | Desai et al. | 703/8 |
| 2004/0010387 A1 * | 1/2004 | Girbig | 702/113 |
| 2004/0123600 A1 * | 7/2004 | Brunell et al. | 60/773 |
| 2004/0176902 A1 * | 9/2004 | McBrien et al. | 701/100 |
| 2004/0243636 A1 | 12/2004 | Hasiewicz et al. | |
| 2006/0089761 A1 * | 4/2006 | Pettigrew et al. | 701/14 |
| 2006/0126608 A1 | 6/2006 | Pereira et al. | |
| 2006/0217870 A1 * | 9/2006 | Hoff et al. | 701/100 |
| 2007/0005527 A1 * | 1/2007 | Parthasarathy | 706/15 |
| 2007/0088570 A1 | 4/2007 | Shetty et al. | |
| 2007/0118271 A1 | 5/2007 | Wiseman et al. | |
| 2007/0260374 A1 | 11/2007 | Morrison et al. | |
| 2008/0086256 A1 | 4/2008 | Stroh | |
| 2008/0141072 A1 | 6/2008 | Kalgren et al. | |
| 2008/0228338 A1 * | 9/2008 | Howard et al. | 701/29 |
| 2008/0235172 A1 | 9/2008 | Rosenstein et al. | |
| 2009/0143871 A1 * | 6/2009 | Gao et al. | 700/29 |
| 2009/0150131 A1 * | 6/2009 | Parthasarathy et al. | 703/7 |
| 2010/0153080 A1 * | 6/2010 | Khan et al. | 703/7 |

* cited by examiner

OPERATIONS SUPPORT SYSTEMS AND METHODS WITH POWER MANAGEMENT

TECHNICAL FIELD

The subject invention relates to the operations support of gas turbine engines, and more particularly, to operations support systems and methods with power management.

BACKGROUND

In the past, when it was desired to determine the physical condition of a gas turbine engine, various engine operating parameters would be measured and recorded during a test flight by a maintenance crew. The recorded data would then be employed to determine the health of the engine and, by way of example, whether turbine blade wear or thermal degradation had effected engine performance. Such a measurement procedure is time consuming and expensive.

The safe operation of a gas turbine engine powered aircraft, and in particular, a rotary wing type aircraft, would be significantly enhanced if the pilot could be provided with real-time information concerning the operational health of an engine. For example, knowing the maximum power availability in advance of attempting to operate or maneuver under a given set of flight conditions would be extremely useful. In addition, accurate real-time engine data would enable a pilot to detect and respond to sensor failures in a timely manner. This information would also be useful in determining the most desirable time to perform routine engine maintenance.

Conventional engine models have also been used by engine manufacturers for fault detection and engine diagnostics. While conventional engine models are useful, they are limited in that they are unable to accurately model engine performance over time. Moreover, conventional engine models do not account for component efficiency degradation over time, nor do they account for higher order thermodynamic and mechanical effects on engine performance. Consequently, conventional engine models have not been used in operational aircraft.

Accordingly, it is desirable to provide improved engine support systems and methods that enhance engine operation and maintenance. In addition, it is desirable to provide operation and support systems and methods with engine diagnostics to accurately model engine performance, power assurance, model-based torque estimates, and system-wide power management. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a power management system includes a data fusion unit configured to receive first health indicators from an engine diagnostics module and second health indicators from a power assurance module. The data fusion unit is configured to data fuse the first and second health indicators. A power assessment and decision support unit is coupled to the data fusion unit and configured to generate power available based on the fused first and second health indicators. A system diagnostic reasoner unit is coupled to the data fusion unit, and configured to provide a system level fault diagnosis based on the fused first and second health indicators. A graphical user interface is coupled to the power assessment and decision support unit and the system diagnostic reasoned unit. The graphical user interface is configured to display the system level fault diagnosis and the power available.

In accordance with another exemplary embodiment, a method of managing power for an aircraft with an engine includes receiving first health indicators from an engine diagnostics module; receiving second health indicators from a power assurance module; fusing the first and second health indicators; generating a system level fault diagnosis; and displaying the system level fault diagnosis.

In accordance with yet another exemplary embodiment, a method of managing power for an aircraft fleet includes receiving first health indicators from a first aircraft; receiving second health indicators from a second aircraft; fusing the first and second health indicators; generating a fleet level fault diagnosis; and displaying the fleet level fault diagnosis.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Broadly, exemplary embodiments discussed herein relate to operations support systems. More specifically, exemplary embodiments include a power management module that receives health indicators from engine modules and fuses the health indicators. A power assessment and decision support unit receives the fused indicators and determines the power available. A system diagnostic reasoner unit also receives the fused indicators and provides a system level fault diagnosis.

Figure 1:
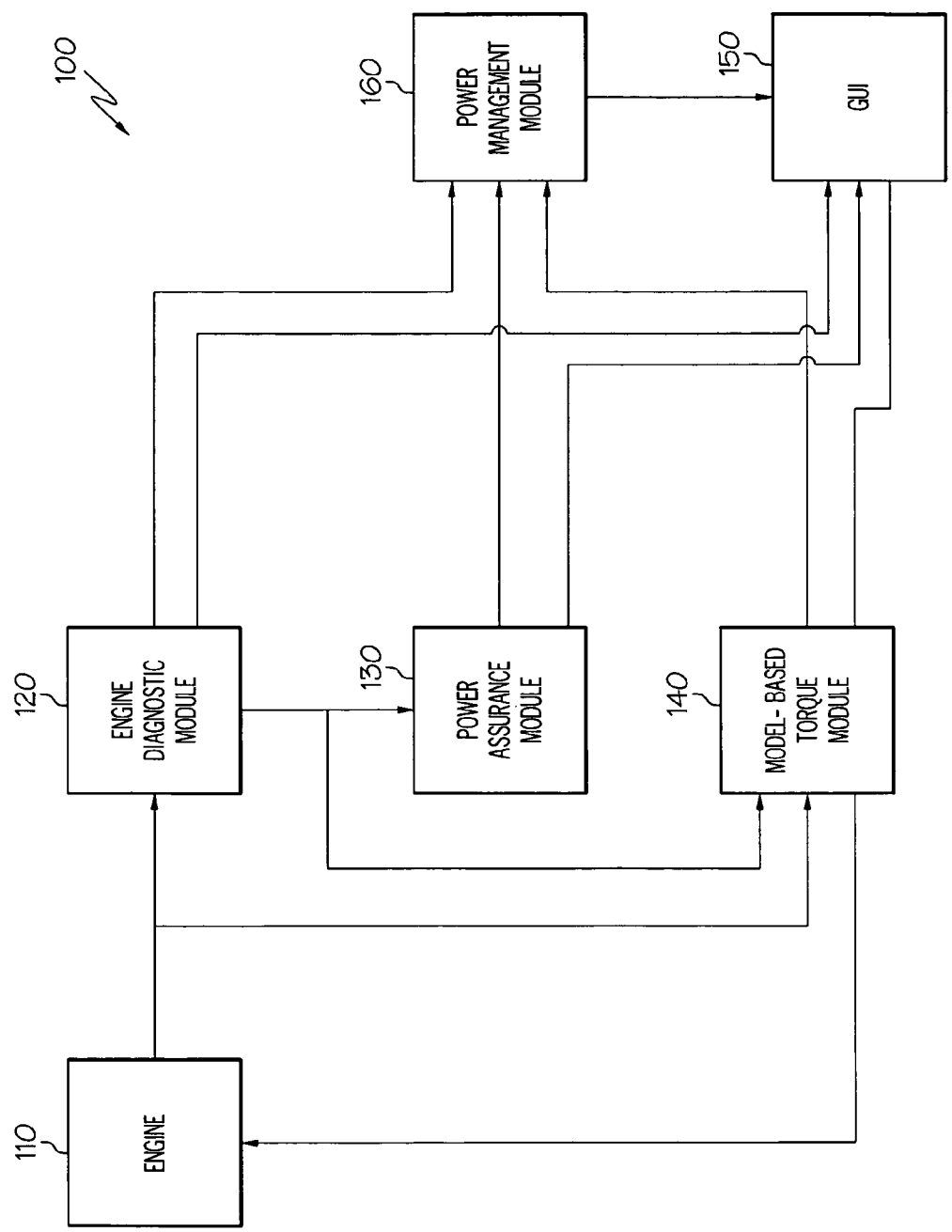
FIG. 1 is a block diagram of an operations support system for supporting and sustaining operation of an engine in accordance with an exemplary embodiment.

FIG. 1 is a block diagram of an operations support system 100 for supporting and sustaining operation of an engine 110. The system 100 processes engine data from the engine 110. The engine 110 can be a gas turbine engine, such as an engine for an aircraft. In one embodiment, the engine 110 can include compressors that supply compressed air to a combustor. The compressed air can be mixed with fuel and ignited in the combustor to produce combustion gases. The combustion gases are directed to high pressure and low pressure turbines that extract energy, for example, to provide horsepower. In one exemplary embodiment, the engine 110 includes a torque sensor that provides a measurement of torque within the engine 110, and supplies the torque measurement to one or more components of the system 100, which will be discussed in greater detail below. In general, the system 100 disclosed herein may be employed in conjunction with any gas turbine engine configuration. In one exemplary embodiment, the engine 110 is a gas turbine engine for an aircraft, such as a helicopter. As discussed in greater detail below, the operations support system 100 may be used to support a single engine 110 or a number of engines, such as for a fleet of aircraft.

As shown in FIG. 1, the system 100 includes an engine diagnostics module 120, a power assurance module 130, and a model-based torque module 140 to support and sustain engine operation. The engine diagnostics module 120, power assurance module 130, and model-based torque module 140 provide outputs to a graphical user interface 150 and a power management module 160. The power management module 160 may also provide outputs to the graphical user interface 150. As will be discussed in further detail below, the engine diagnostics module 120, power assurance module 130, and model-based torque module 140 receive engine data and output condition and/or health indictors to the power management module 160 and the graphical user interface 150 to assist in operating and maintaining the aircraft. The modules 120, 130, 140, 160 may use engine data, one or more thermodynamic models, configuration data, and user inputs to generate the condition indicators. In turn, these condition indicators may be used to generate health indicators. Generally, condition indicators describe aspects about a particular component or system that may be useful in making a determination about the state or health of the component or system, which may be reflected in a health indicator that depends on one or more condition indicators. Moreover, the condition indicators and health indicators can be used to determine the future health of the component or system, as is reflected in a prognostic indicator.

In general, the engine diagnostics module 120, power assurance module 130, model-based torque module 140, and graphical user interface 150 are located on-board the aircraft, while the power management module 160 is located off-board the aircraft. However, any of the components of the system 100 may be located on-board the aircraft, off-board the aircraft, or a combination of on-board and off-board the aircraft. The modules 120, 130, 140, 160 each contain or share processing components necessary to accomplish the individual and collective functions discussed in greater detail below. As some examples, the processing components may include digital computers or microprocessors with suitable logic circuitry, memory, software and communication buses to store and process the models within the modules discussed below. The modules 120, 130, 140, 160 will now be described with reference to FIGS. 2-5.

Figure 2:
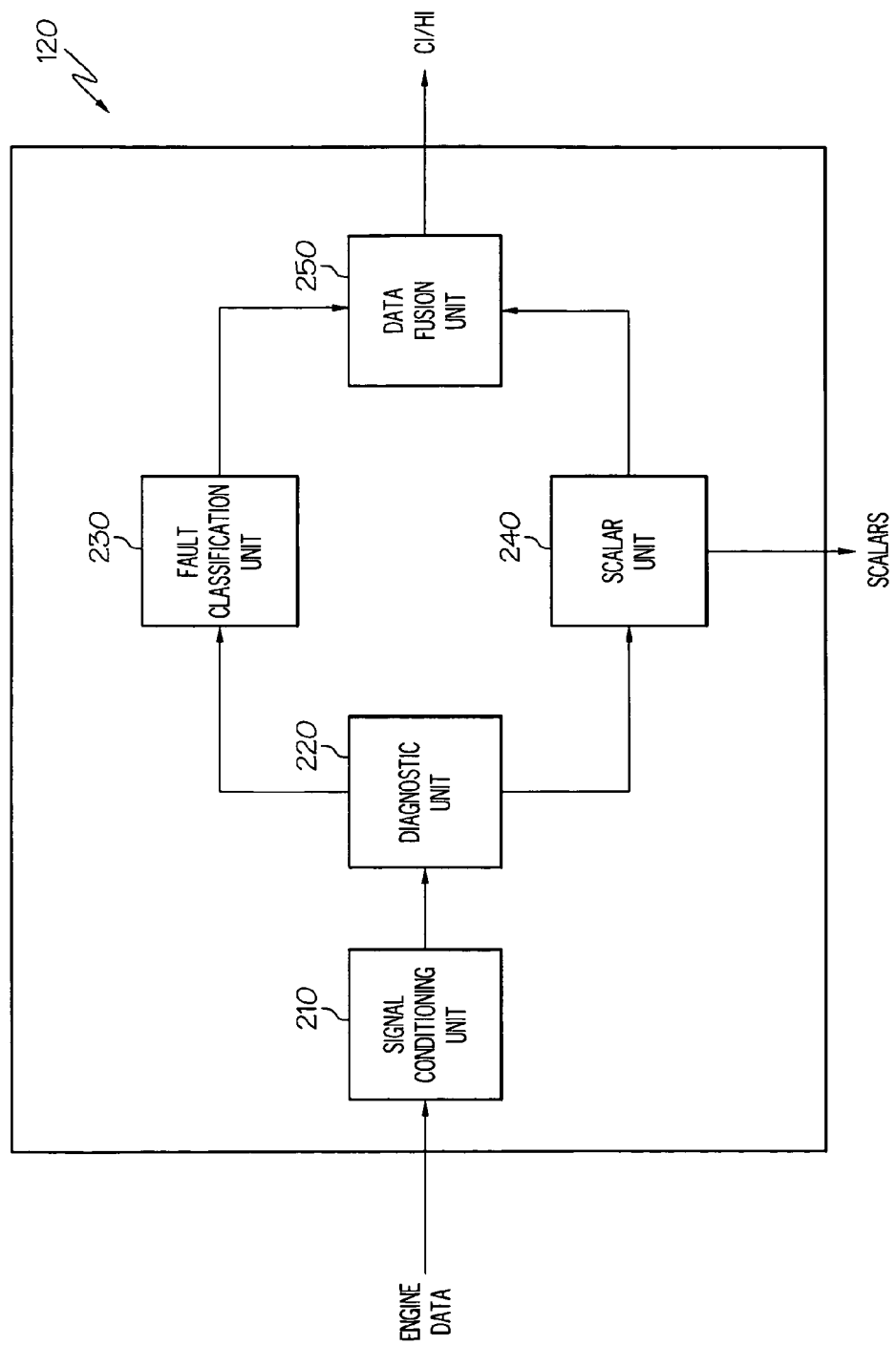
FIG. 2 is a block diagram of an engine diagnostics module of the operations support system of FIG. 1 in accordance with an exemplary embodiment.

FIG. 2 is a block diagram of the engine diagnostics module 120 in accordance with an exemplary embodiment. As noted above, engine data is received by the engine diagnostics module 120 as inputs. The engine data can include any suitable type of data related to the engine or aircraft, such as for example, one or more of the following: engine operating hours; static pressure, total pressure, and temperature at various positions within the engine 110, such as the inlet or outlet of the compressors, combustor, and turbines; gas producer speed; engine torque; engine torque sensor voltage; temperature at the oil resistance bulb; and metered fuel flow. Other engine data can include the calibrated airspeed of the aircraft, ambient temperature, and ambient total pressure.

The engine diagnostics module 120 includes a signal conditioning unit 210 that receives the engine data and performs in-range and signal validity checks. The signal conditioning unit 210 may further perform unit conversion and scaling on the engine data such that it is suitable for use by subsequent units. Finally, the signal conditioning unit 210 performs some filter/sampling and steady state detection.

The conditioned engine data from the signal conditioning unit 210 is provided to the diagnostic unit 220. The diagnostic unit 220 processes the data through an engine diagnostic model. In general, the diagnostic unit 220 provides fully automated, steady state, on-board engine diagnostics. The model used by the diagnostic unit 220 is a mathematical representation of the engine 110 based on component maps. The diagnostic unit 220 is configured to match the model engine operating parameters to the measured engine operating parameters, and to generate condition indicators for the engine components.

The diagnostic unit 220 additionally produces scalars based on the model. In one embodiment, scalars are the difference between expected engine states and the actual engine states. These differences could be a result, for example, of engine-to-engine differences and/or erosion of engine components. In one example, the scalars can represent the erosion of the turbine blades. The scalars may be utilized as coefficients, biases, and adders used to adjust the thermodynamic equations of the model. As one example, the scalars scale engine component airflows and efficiencies to match the measured data. This matching process is accomplished by executing an adaptive algorithm designed to iteratively adjust or adapt the nominal engine component efficiencies using the scalars. As such, the thermodynamic engine model accurately mirrors actual engine performance over time, and the model is improved as an engine-specific model.

The diagnostic unit 220 provides the condition indicators and scalars to the fault classification unit 230, which includes a pattern recognition algorithm that maps the condition indicators to a library of known fault patterns. The fault classification unit 230 may then generate health indicators based on the confidence intervals that indicate, for example, the individual contributions of each engine component on overall engine performance degradation. The health indicators may also generate the confidence and severity of any detected faults as fault confidence and severity information.

The scalar unit 240 also receives the scalars data from the diagnostic unit 220 and provides binning and storing of engine diagnostic scalars, as well as statistical analysis of the binned data and mathematical representations of the stored data. The stored scalar information may be accessed and used by other components of the system 100, as will be discussed in greater detail below.

A data fusion unit 250 of the engine diagnostics modules 120 receives the health indicators from the fault classification unit 230. The data fusion unit 250 additionally receives historical scalars from the scalar unit, and fuses this data to increase confidence of the health indicators. The health indicators, which may now include enhanced fault confidence and severity information for the engine components, are then provided to the power management module 160 and the graphical user interface 150, as will be discussed in greater detail below.

Figure 3:
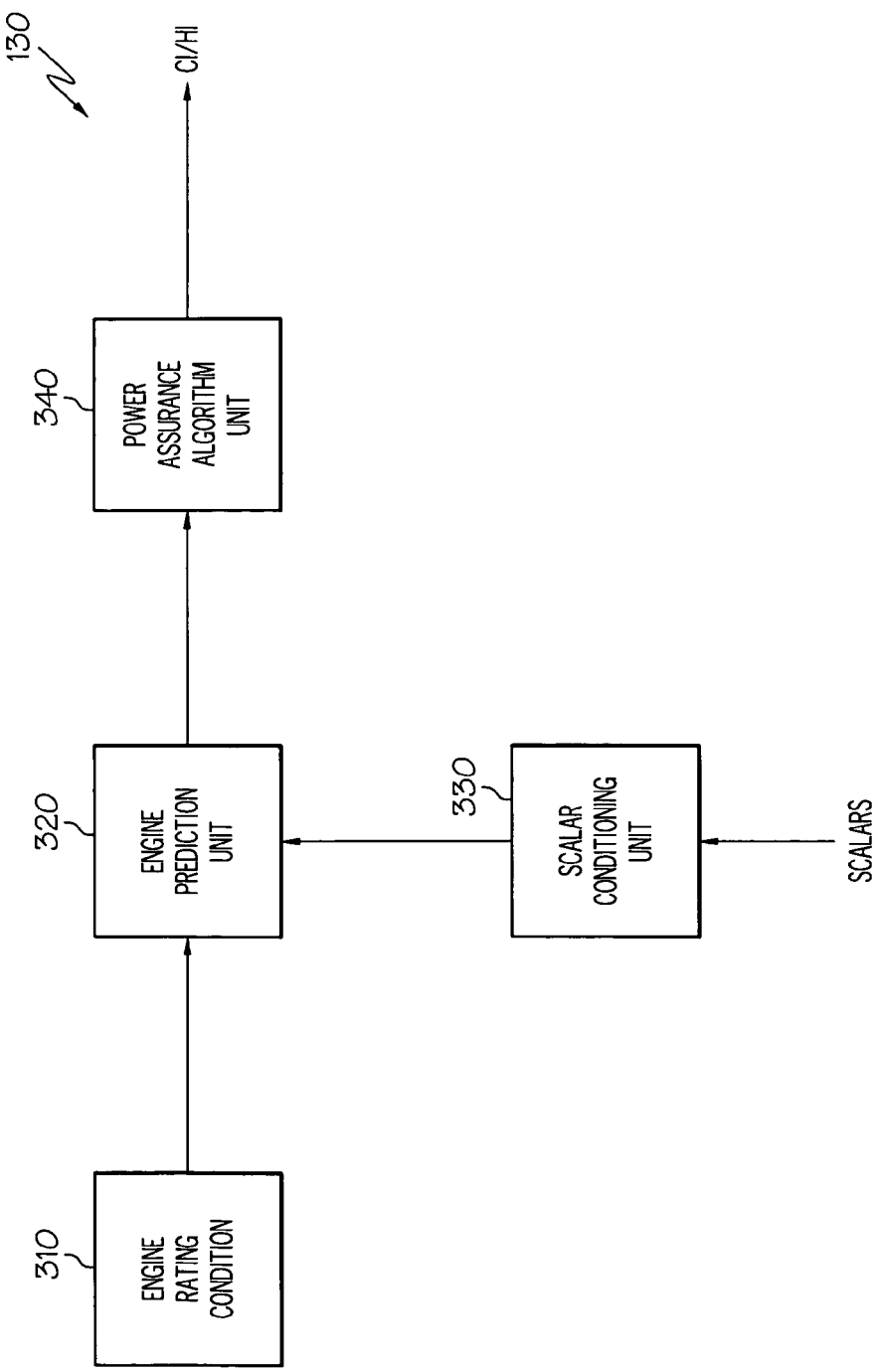
FIG. 3 is a block diagram of a power assurance module of the operations support system of FIG. 1 in accordance with an exemplary embodiment.

FIG. 3 is a block diagram of the power assurance module 130 in accordance with an exemplary embodiment. In general, the power assurance module 130 accurately predicts the maximum engine power availability to enable a pilot to know whether the engine has sufficient power to perform a particular maneuver.

An engine rating unit 310 provides an engine rating condition to an engine prediction unit 320. A scalar conditioning unit 330 receives the scalar inputs from the scalar unit 240 of the engine diagnostics module 120 (FIG. 2), and monitors scalar changes, both long-term and short-term. The conditioned scalars are provided to the engine prediction unit 320 that uses a thermodynamic model to predict engine health. As in the model discussed above in the diagnostic unit 220 (FIG. 2), the model used by the engine prediction unit 320 is fully automated, steady state, and based on a mathematical representation of component maps. The model of the engine prediction unit 320 is programmed to match the model engine operating parameters, and to generate condition indicators associated with the power of the engine. The scalars provided by the scalar conditioning unit 330 enable an engine-specific model.

The condition indicators are provided to a power assurance algorithm unit 340, which compares current engine condition to minimum or threshold deteriorated engine condition. The power assurance algorithm unit 340 generates health indicators based on the condition indicators. The health indicators produced by the power assurance algorithm 340 may include engine margins, such as speed, temperature, power, and fuel flow and power assurance numbers, if applicable. The health indicators, including the power assurance numbers, are provided to the power management module 160, the graphical user interface 150, and/or other modules as necessary. In one exemplary embodiment, the power assurance number is a dimensionless number that is calculated from an engine power, temperature, or speed margin, IE, amount greater than a minimally-acceptable engine. In effect, the power assurance number can be a normalized engine margin. Alternatively, the power assurance number may be considered an output of an operational power check procedure that ensures the installed engines are producing at least minimum acceptable power (or torque).

In one exemplary embodiment, the power assurance module 130 does not use variable charts that are functions of ambient or flight conditions and/or require pilot interaction, and allows a comparison to an established performance level determined to be the minimal accepted engine output. Additionally, in one exemplary embodiment, the power assurance module 130 does not use pre-determined assumptions about engine lapse rates, or rely on aircraft set-up to called-out conditions. This results in an improved, more accurate, and consistent power calculation.

Figure 4:
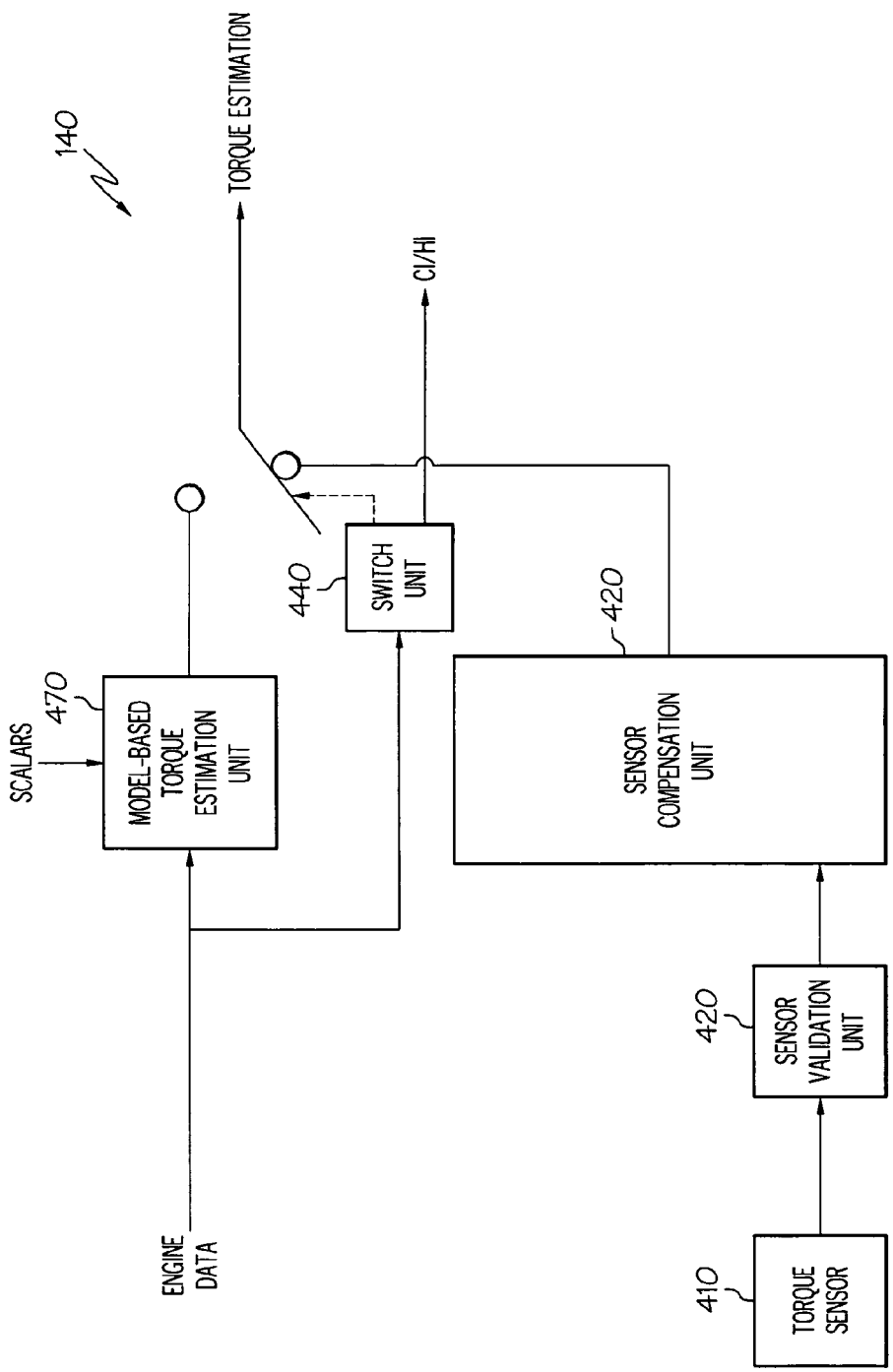
FIG. 4 is a block diagram of a model-based torque module of the operations support system of FIG. 1 in accordance with an exemplary embodiment.

FIG. 4 is a block diagram of the model-based torque module 140 in accordance with an exemplary embodiment. In general, the model based torque module 140 provides a model-based software analytic tool to estimate torque in view of engine environmental factors and torque measurement system failures. For example, the model based torque module 140 can act as a back-up device in the failure of torque sensor hardware.

As noted above, the model-based torque module 140 receives inputs from a torque sensor 410 within the engine 110 (FIG. 1). The sensor signals are evaluated by a sensor validation unit 420, which detects in-range faults of the torque sensor 410 during transient and steady state conditions. The sensor validation unit 420 may use reference and tolerance tables to evaluate the sensor signals. The validated sensor signals are then processed by a sensor compensation unit 430 that compensates for environmental effects that may affect the accuracy of the torque sensor 410. The environmental compensation can be based on, for example, oil temperature. The sensor compensation unit 430 may further compensate for hardware variation effects such as unit-to-unit bias from other engine and control components. The validated and compensated torque sensor signals are then provided to engine control units as torque estimates for operation of the engine 110 (FIG. 1).

The engine data is also provided to switch unit 440. If the switch unit 440 detects a fault in the signals from the torque sensor 410, the switch unit 440 modifies the source of the torque estimates provided to the engine control units. In particular, the torque estimates are provided by the model-based torque estimation unit 470, which uses a real-time physics based transient engine model to estimate torque and other engine parameters. The model-based torque estimation unit 470 estimates torque based on at least some of the engine data discussed above with respect to the engine diagnostics module 120 (FIG. 1), such as fuel flow and power turbine speed within the engine 110 (FIG. 1). The model-based torque estimation unit 470 may further estimate torque based on onboard data such as calibrated airspeed, ambient temperature, and ambient total pressure, as well as scalar information from the scalar unit 240 (FIG. 1). In one embodiment, the model is a thermodynamic model such as that discussed above in reference to FIG. 2. Accordingly, the model-based torque estimation unit 470 provides an estimate of torque for the engine control units based on an engine model that is characterized by component maps. The switch unit 440 will further provide a health and condition indicators for the torque sensor 410 to the power management module 160 (FIG. 1), as discussed below, and/or the graphical user interface 150 (FIG. 1).

In one exemplary embodiment, the model based torque module 140 can provide an accurate indication of actual torque within 5% at steady state and within 10% at transient state. As such, the model-based torque module 140 enables improved torque signal accuracy, enhanced flight safety through redundancy, support of condition-based maintenance with diagnostics and prognostics, and increased confidence level of power assurance results and power management functions. More particularly, the model-based torque module 140 enables improved flight safety by continuous display of torque to a pilot after the sensor fails, prevention of an over-torque condition in the drive-train by allowing engine control system or pilot to continue torque limiting function with virtual sensor signal after hardware failure, and enabling manual checks on power availability and safe mission decision in flight after torque sensor failure. The model-based torque module 140 increases the ability to discriminate torque system failure from other hardware failure and reduces the likelihood of incorrect power assurance results or torque-split observations. As such, the model-based torque module 140 provides a reduction of false removal rate of torque sensor and other hardware, a reduction in maintenance labor during trouble shooting evaluations, and a reduction in inspection per flight hours.

Figure 5:
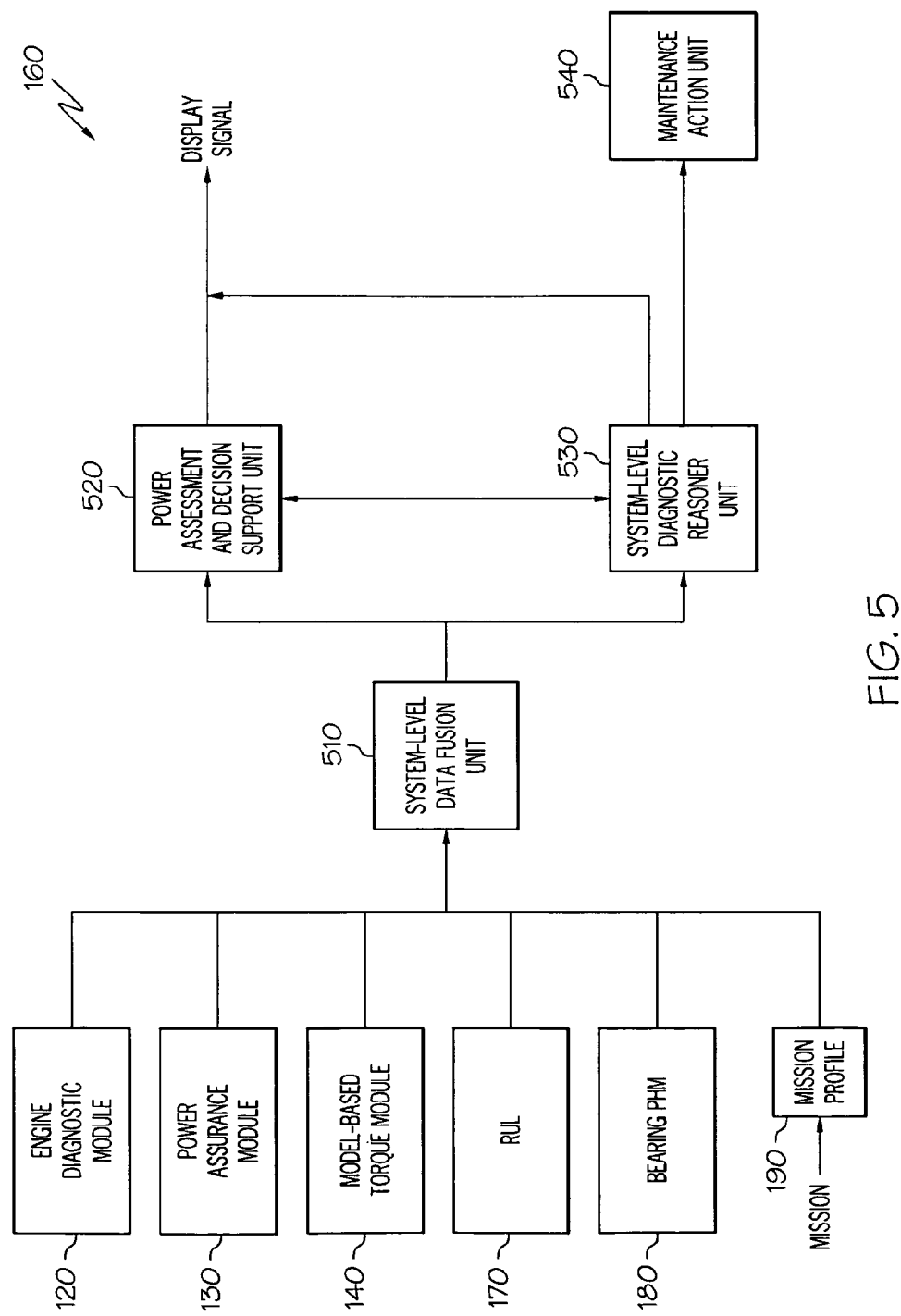
FIG. 5 is a block diagram of a power management module of the operations support system of FIG. 1 in accordance with an exemplary embodiment.

FIG. 5 is a block diagram of the power management module 160 in accordance with an exemplary embodiment. In general the power management module 160 includes engine power assessment and decision support software to provide streamlined, real-time power management.

As shown in FIG. 5, the power management module 160 receives condition and health indicators from the engine diagnostics module 120, the power assurance module 130, and the model-based torque module 140, as well as any other type of additional module 170, 180. In the depicted exemplary embodiment, the additional modules 170, 180 include a remaining useful life module 170 and bearing health module 180. The power management module 160 also receives a mission profile from a mission profile unit 190 and other aircraft data. The mission profile can include aircraft power requirements and mission operational statistics, such as aircraft configuration, mission duration, mission criticality, mission environment, flight regime, flight profile histories, and flight profile derivatives.

The condition and health indicators are initially received by a system-level data fusion unit 510 that consolidates, trends, and processes the indicators. The system-level data fusion unit 510 can consider indicators from one module in view of indicators from other modules to produce enhanced health indicators. The enhanced health indicators are provided to a power assessment and decision support unit 520, which provides a evaluation of the power available relative to the power required to support mission execution, either continuously or on demand. The system-level data fusion unit 510 additionally provides the consolidated indicators and mission profile data to a system diagnostic reasoner unit 530 that uses corroborative evidence in the indicators from individual modules to provide a system-level fault diagnosis, including fault/failure mode ranking. For example, the system diagnostic reasoner unit 530 may include may use, for example, regression trending and prognostic forecasting to project the failure time of the torque sensor based on the health and condition indicators from the model-based torque module 140. The health and condition indicators are then processed by the maintenance action unit 540, which provides recommendations for actionable maintenance items; fault-driven troubleshooting, inspections, and/or maintenance; and condition-based and scheduled maintenance recommendations.

The power management module 160 provides increased automations, accuracy, and confidence level of the power assurance module 130. This results in a reduction in pilot and crew workload, a reduction in operational and maintenance test flights, increased time on wing, improved engine removal decisions, improved readiness, and improved situational awareness.

Figure 6:
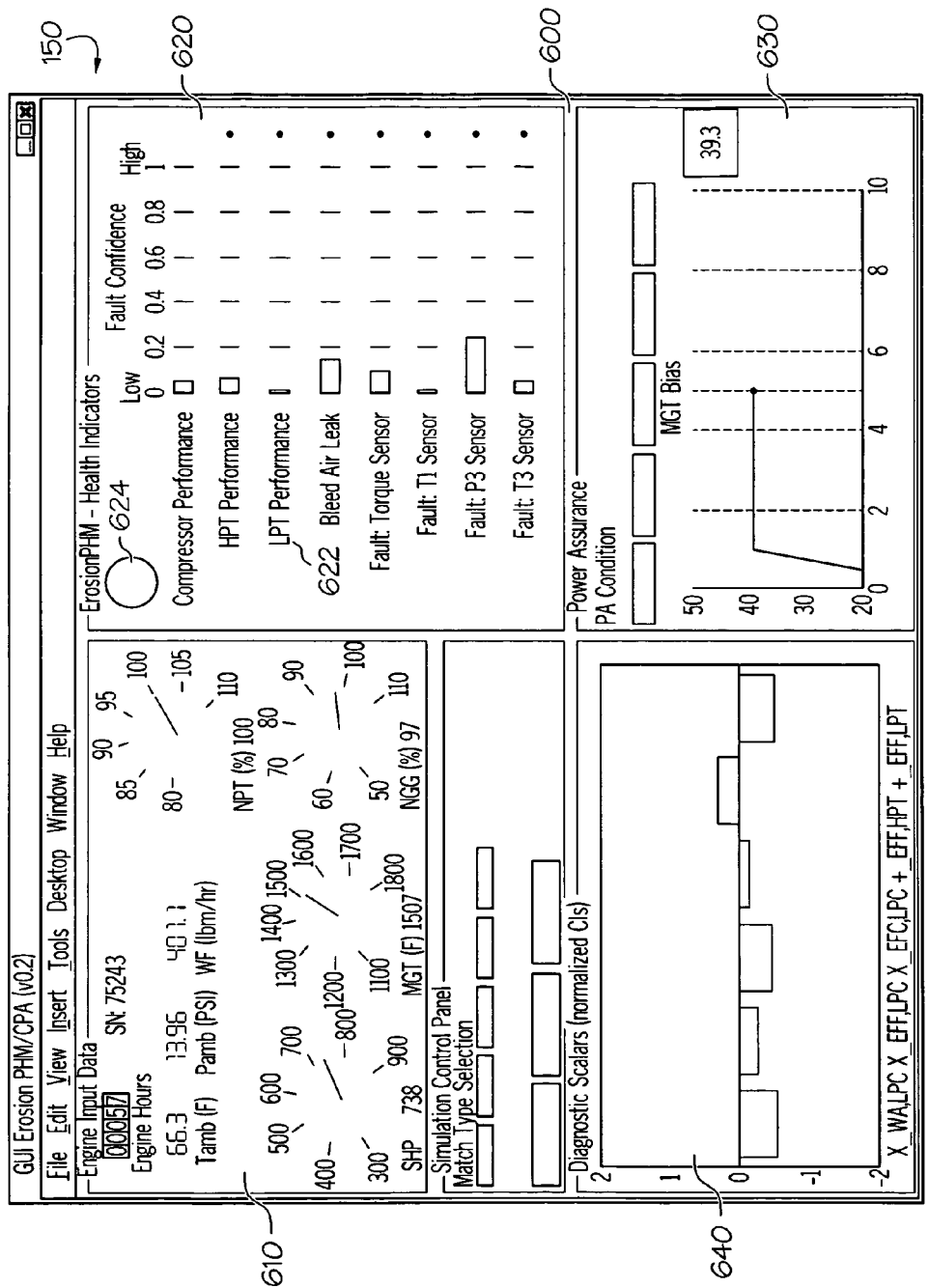
FIG. 6 is a visual display rendered by the operations support system of FIG. 1 in accordance with an exemplary embodiment.

FIG. 6 is a visual display 600 rendered by the operations support system 100 of FIG. 1 in accordance with an exemplary embodiment that provides real-time operational health of the engine. The visual display 600 may be provided, for example, on the graphical user interface 150. The visual display 600 includes current conditions 610, including engine hours, temperature, pressure, and component measurements. The visual display 600 further includes a display area for health and condition indicators 620, including confidence levels 622 and health indicator warnings 624, which may be provided for any of the engine components by, for example, the engine diagnostics module 120 (FIG. 2) or the model-based torque module 140 (FIG. 4). As one example, the health indicator warning 624 may be color coded to indicate a warning condition or level. For example, if the health indicator warning 624 is green, no problem is detected for that component. However, a yellow health indicator warning 624 may indicate that maintenance is needed, and a red health indicator warning 624 may indicate a more urgent condition.

The visual display 600 further includes power assurance 630, for example, from the power assurance module 130 (FIG. 3). Power assurance 630 indicates the power assurance numbers over time, and may, as desired, anticipate power assurance into the future. Scalar information 640 can also be provided, for example, by the model-based torque module 140 (FIG. 4).

Figure 7:
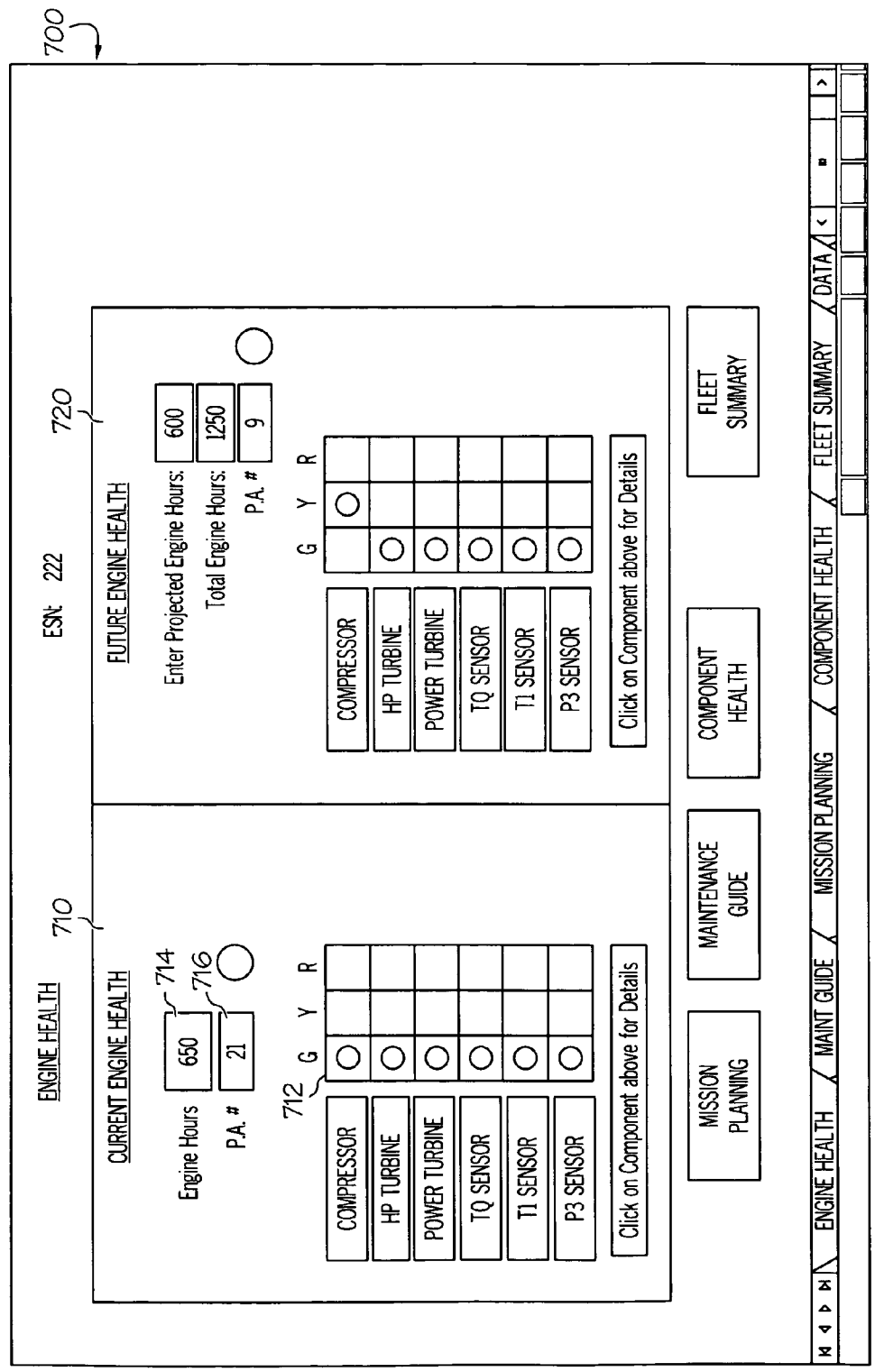
FIG. 7 is an engine diagnostic visual display rendered by the power management module of FIG. 5 in accordance with an exemplary embodiment.

FIG. 7 is an engine diagnostic visual display 700 rendered by the power management module 160 of FIG. 5 in accordance with an exemplary embodiment. The visual display 700 displays information based on data, for example, from the engine diagnostics module 120, and includes, for example, information associated with current engine health 710 and future engine health 720. The current engine health 710 includes health indicators 712 for various engine components, such as the compressor, high pressure turbine, low pressure turbine, and the torque, temperature, and pressure sensors. The current engine health 710 also includes an engine hours read-out 714 and a power assurance indicator 716. The future engine health information 720 is based on a projected engine hours 722 entered by a user, which modifies the total engine hours read-out 724 and the power assurance indicator 726. The future engine health information 720 further includes prognostic indicator 728. In the exemplary embodiment displayed in FIG. 7, the additional engine hours may be an issue for the compressor, as indicated by the yellow warning.

Figure 8:
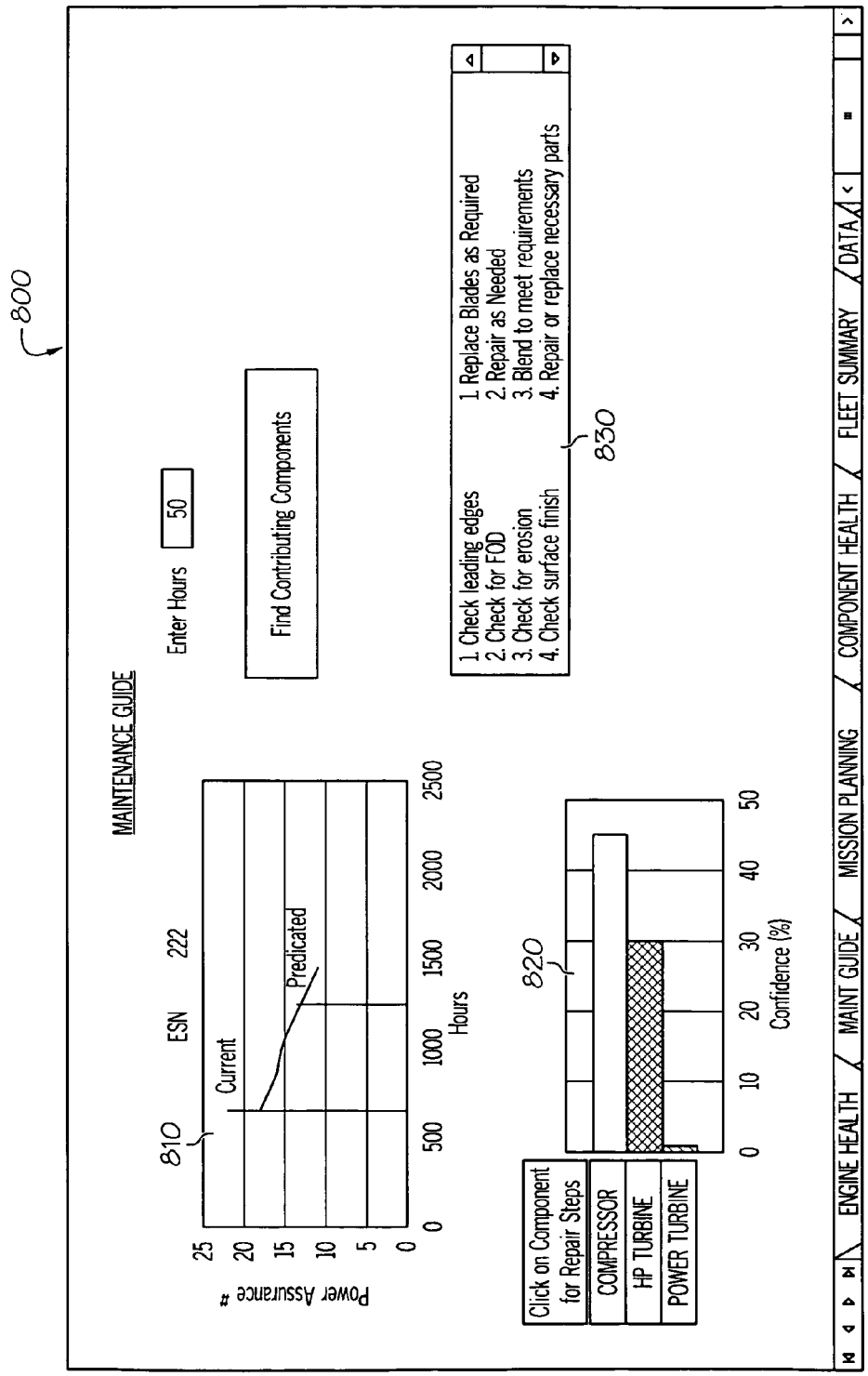
FIG. 8 is a maintenance guide visual display rendered by the power management module of FIG. 5 in accordance with an exemplary embodiment.

FIG. 8 is a maintenance guide visual display 800 rendered by the power management module 160 of FIG. 5 in accordance with an exemplary embodiment. The visual display 800 displays a maintenance guide, which includes power assurance trending and prognosis 810. The maintenance guide visual display 800 further includes a confidence level 820 for various components and a maintenance checklist 830.

Figure 9:
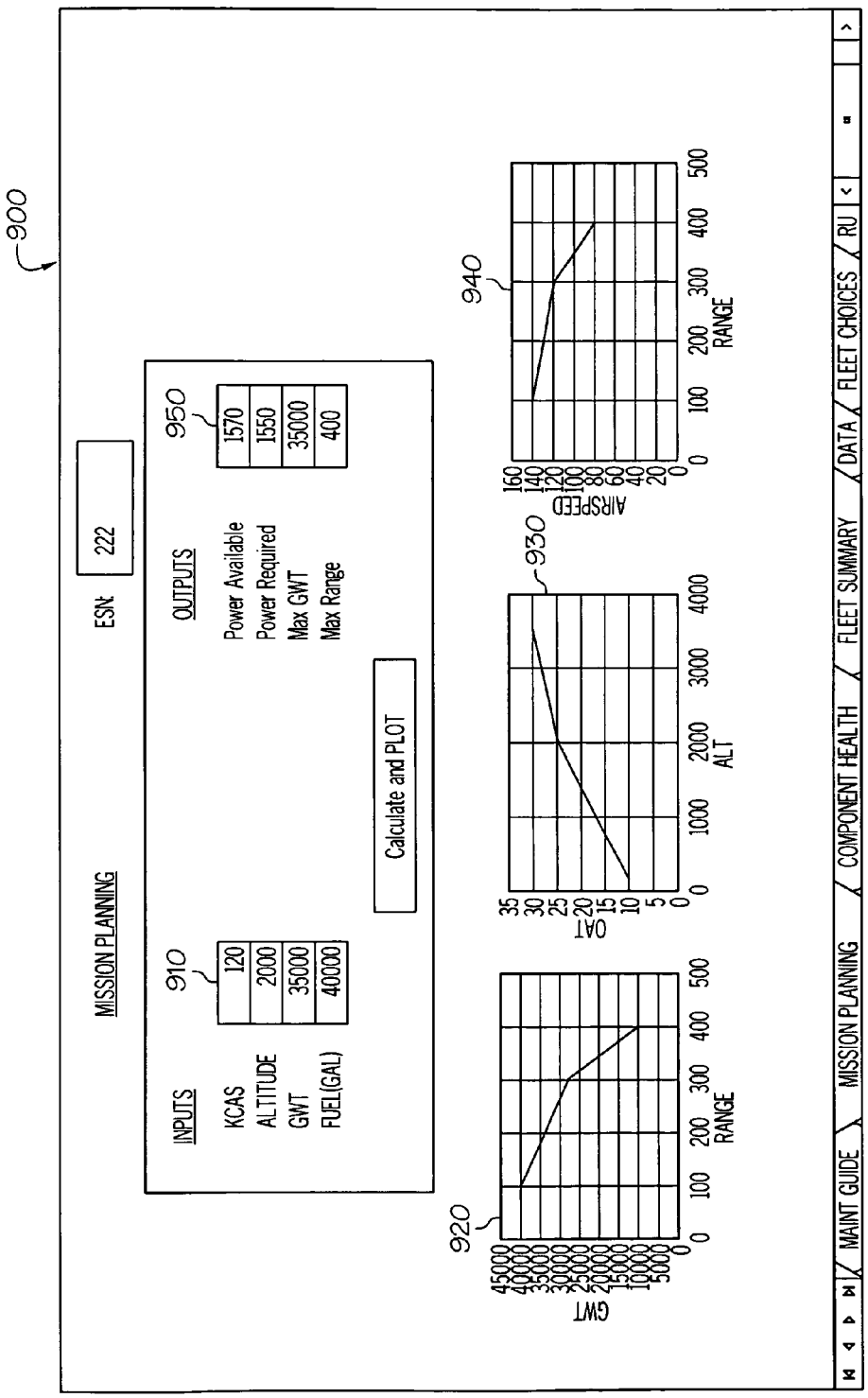
FIG. 9 is a mission planning visual display rendered by the power management module of FIG. 5 in accordance with an exemplary embodiment.

FIG. 9 is a mission planning visual display 900 rendered by the power management module 160 of FIG. 5 in accordance with an exemplary embodiment. In particular, the mission planning visual display 900 displays the power trade-offs for a particular mission 910. For example, for a particular mission 910, the mission planning visual display 900 indicates a first plot 920 with range in view of weight, a second plot 930 with altitude in view of temperature, and a third plot 940 with range in view of airspeed. The mission planning visual display 900 may further display resources available 950, including the power available, power required for the mission, maximum ground weight, and maximum range.

Figure 10:
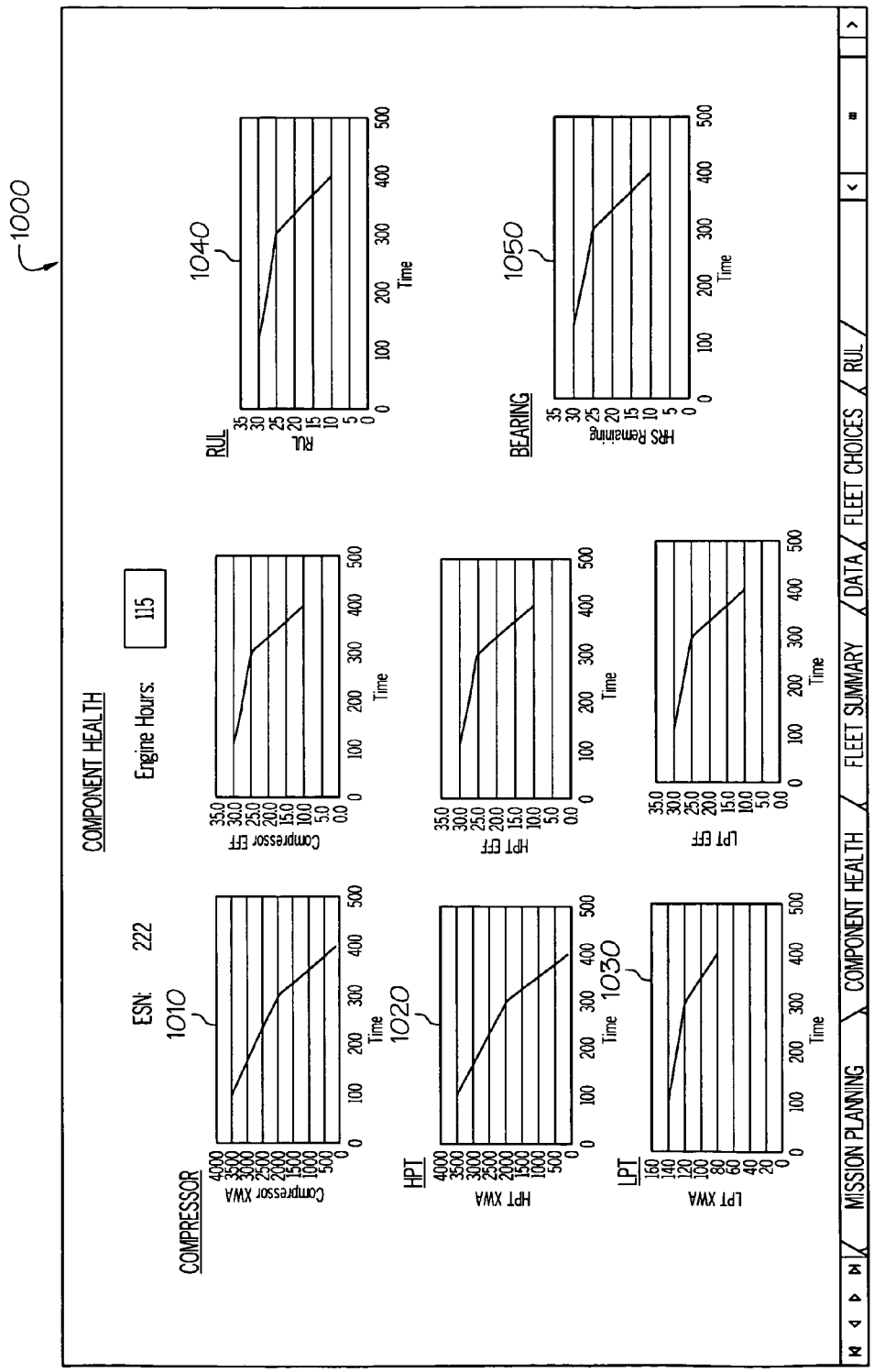
FIG. 10 is a component health visual display rendered by the power management module of FIG. 5 in accordance with an exemplary embodiment.

FIG. 10 is a component health visual display 1000 rendered by the power management module 160 of FIG. 5 in accordance with an exemplary embodiment. In the displayed exemplary embodiment, the component health visual display 1000 includes the airflow and efficiency plots 1010 of the compressor, the airflow and efficiency plots 1020 of the high pressure turbine, and the airflow and efficiency plots 1030 of the low pressure turbine. The remaining useful life 1040 and bearing hours remaining life 1050 are also displayed in this exemplary embodiment. In other embodiment, other components can also be displayed.

Figure 11:
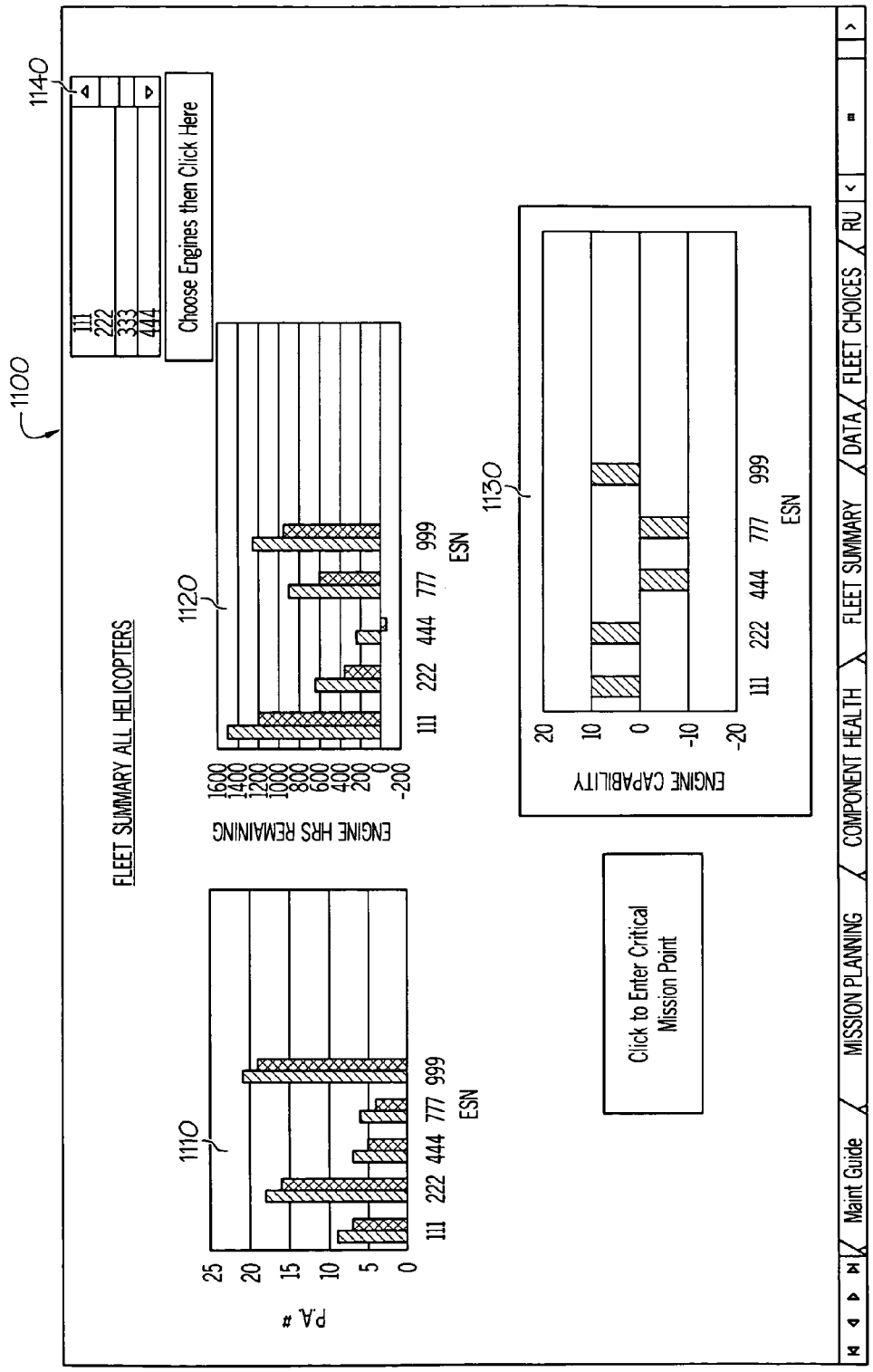
FIG. 11 is a fleet level visual display rendered by the power management module of FIG. 5 in accordance with an exemplary embodiment.

FIG. 11 is a fleet level visual display rendered by the power management module 160 of FIG. 5 in accordance with an exemplary embodiment. The fleet level visual display 1100 enables a summary display of the entire fleet of aircraft.

Individual aircraft may be selected from menu 1140. The display 1110 includes power assurance numbers 1110, engine hours remaining 1120, both in a current time period and into the future based on mission parameters, and engine capacity 1130 for the selected aircraft.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A power management system, comprising:
   an engine diagnostics module configured to receive engine data from an engine and to generate first health indicators based on the engine data using a thermodynamic model, the thermodynamic model being based on component maps associated with the engine, wherein the engine diagnostics module is further configured to generate scalars based on the thermodynamic model and wherein the engine diagnostics module is further configured to adjust thermodynamic equations of the thermodynamic model based on the scalars;
   a data fusion unit coupled to the engine diagnostics module and configured to receive the first health indicators from the engine diagnostics module and second health indicators from a power assurance module, the data fusion unit configured to data fuse the first and second health indicators;
   a power assessment and decision support unit coupled to the data fusion unit and configured to calculate power available based on the fused first and second health indicators;
   a system diagnostic reasoner unit coupled to the data fusion unit, and configured to provide a system level fault diagnosis based on the fused first and second health indicators, wherein the system level fault diagnosis further includes power assurance numbers; and
   a graphical user interface coupled to the power assessment and decision support unit and the system diagnostic reasoned unit, the graphical user interface configured to display the system level fault diagnosis and the power available.

2. The power management system of claim 1, wherein power assessment and decision support unit is configured to receive a mission profile, and to compare the power available to power necessary according the mission profile.

3. The power management system of claim 1, wherein the system fault diagnosis include a maintenance action plan.

4. The power management system of claim 1, wherein the data fusion unit is configured to receive third health indicators from a model-based torque module.

5. The power management system of claim 4, wherein the system diagnostic reasoner unit is configured to project a failure time of a torque sensor based on the third health indicators from the model-based torque module.

6. The power management system of claim 1, wherein the system level fault diagnosis further includes fault/failure mode ranking.

7. The power management system of claim 1, wherein the system level fault diagnosis further includes prognostic indicators.

8. The power management system of claim 1, wherein the graphical user interface is configured to display current engine and future engine health based on the system level fault diagnosis.

9. The power management system of claim 1, wherein the graphical user interface is configured to display the power available relative to a mission profile.

10. The power management system of claim 1, wherein the system level fault diagnosis further includes component health of engine components.

11. The power management system of claim 1, wherein data fusion unit is configured to receive the first health indicators and the second health indicators from a plurality of aircraft, the graphical user interface being configured to display the fused health indicators for the plurality of aircraft.

12. The power management system of claim 11, wherein the graphical user interface is configured to display the fused health indicators for each of the plurality of aircraft.

13. The power management system of claim 1, wherein the system level fault diagnosis further includes engine hours remaining.

14. The power management system of claim 1, wherein the engine diagnostics module is further configured to adjust thermodynamic equations of the thermodynamic model based on the scalars by scaling engine component airflows and efficiencies to match measured data.

15. A method of managing power for an aircraft with an engine, comprising:
   collecting engine data;
   generating condition indicators from the engine data using a thermodynamic model based on component maps associated with the engine;
   generating scalars from the engine data using the thermodynamic model;
   generating first health indicators from the condition indicators with an engine diagnostics module;
   modifying the thermodynamic model based on the scalars;
   receiving the first health indicators from the engine diagnostics module;
   receiving second health indicators from a power assurance module;
   fusing the first and second health indicators;
   generating a system level fault diagnosis based on the fused first and second health indicators; and
   displaying the system level fault diagnosis,
   wherein the generating a system level fault diagnosis step includes generating power available, and
   further comprising receiving a mission profile and comparing the power available to power necessary according the mission profile.

16. The method of claim 15, further comprising generating a maintenance action plan.

17. The method of claim 15, wherein the generating a system level fault diagnosis step includes generating a fault/failure mode ranking.

18. The method of claim 15, further comprising generating prognostic indicators.

19. A method of managing power for an aircraft fleet, comprising:
   receiving first health indicators from a first aircraft;
   receiving second health indicators from a second aircraft, each of the first and second health indicators being generating from engine data using at least one thermodynamic model based on component maps associated with an engine of the respective first and second aircraft;

generating scalars from the engine data of the respective first and second aircraft using the at least one thermodynamic model;

modifying the at least one thermodynamic model based on the scalars;

fusing the first and second health indicators;

generating a fleet level fault diagnosis, wherein the generating the fleet level fault diagnosis includes generating power available for each of the first aircraft and the second aircraft; and receiving a mission profile and comparing the power available for each of the first aircraft and the second aircraft to power necessary according the mission profile; and displaying the fleet level fault diagnosis.

* * * * *